May 9, 1950     E. S. FIELDS     2,506,634
JACK AND LUBRICATED BEARING MEANS THEREFOR
Filed Jan. 22, 1946
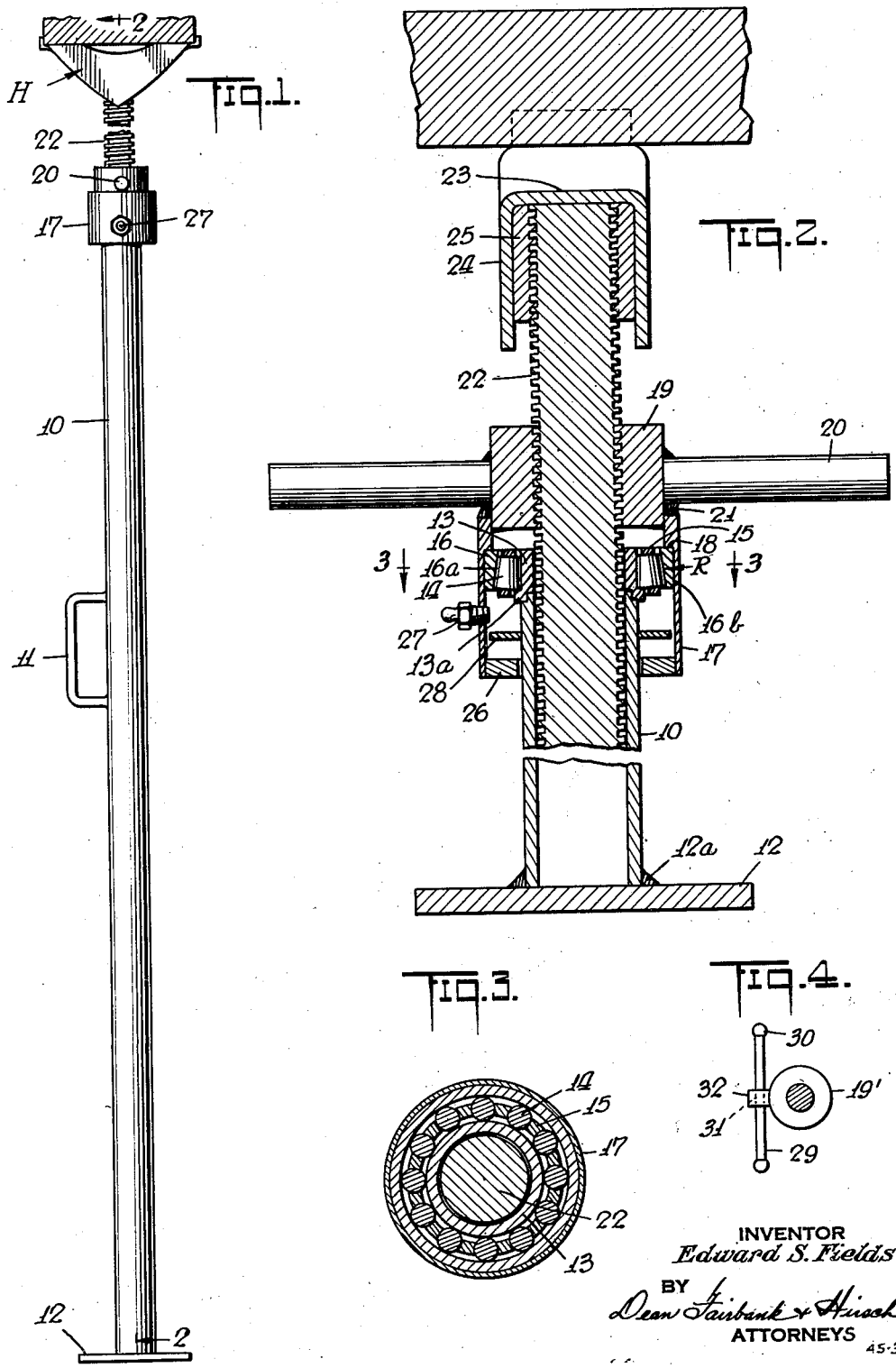
INVENTOR
Edward S. Fields
BY
Dean Fairbank & Hirsch
ATTORNEYS Patented May 9, 1950

2,506,634

UNITED STATES PATENT OFFICE 2,506,634

JACK AND LUBRICATED BEARING MEANS THEREFOR

Edward S. Fields, Morgantown, W. Va.

Application January 22, 1946, Serial No. 642,659

3 Claims. (Cl. 254—98)

The present invention relates to jacks and more especially to mine, roof or timber jacks.

It is among the objects of the invention to provide a jack of the above category, which shall be largely of inexpensive tube, bar and plate stock easily assembled, with a standard type of antifriction bearing, the moving parts of which jack are completely enclosed and readily maintained packed with grease and relatively free from access of dust, dirt or grit and inherently protected against mechanical injury, and which though of light construction, shall yet have adequate strength.

In the accompanying drawings in which are shown one or more of various possible embodiments of the several features of the invention, Fig. 1 is a side elevation of the jack, Fig. 2 is a view in longitudinal cross section on a larger scale, and with parts broken away, taken on line 2—2 of Fig. 1, Fig. 3 is a view in transverse cross section, taken on line 3—3 of Fig. 2 and on a like scale, and Fig. 4 is a transverse sectional view taken above the handle, of a slight modification.

Referring now to the drawings, the jack comprises a tubular standard 10, desirably of round steel tubing, provided with the conventional handle loop 11 welded thereto. The standard is desirably welded as at 12a to a flat base plate 12.

The standard mounts a precision type roller bearing R, the inner race 13 of which is welded to the upper end of the standard. The rollers 14 in roller cage 15 encompass the inner race 13, with the rollers riding upon the outwardly protruding ledge 13a of the inner race. The conical bore 16a of the outer race 16 rides on the rollers 14 and supports a cylindrical shell 17. To this end the shell has an inner peripheral shoulder 18, which rests upon said outer race 16 and the inner wall of the cylindrical shell 17 encompasses the outer cylindrical wall 16b of the outer race.

The shell 17 is formed as a unitary skirt of the nut 19, which latter has diametrically opposed operating handles 20 of bar stock welded thereto. To this end nut 19 may be telescoped into the upper end of the shell 17 and welded in place at 21 as shown, into a structure integral therewith.

Through the nut 19 extends the jack screw 22 which protrudes downward into the tubular standard 10 and carries the head H which desirably is of a piece of thick sheet metal stock 23 with the lateral downwardly bent flanks 24, embracing the socket 25 welded in place therebetween, into which the upper end of the jack screw is rigidly affixed as by soldering or welding.

Preferably the lower end of the skirt 17 has rigidly affixed thereto, or if desired made as an integral part therewith, an annulus 26, surrounding the jack screw. The roller bearing about the jack screw is thus enclosed in a case, the lateral wall of which is the skirt 17, the lower wall the annulus 26 and the upper wall the nut 19.

The case is readily packed with grease through a grease nipple 27 in the side of the skirt and preferably a baffle plate 28 which may be welded to the upper part of the standard between the roller bearing R and the annulus blocks the downward flow of the grease.

In operation, after the jack is put in position, the handles 20 are turned, thereby rotating the nut 19 with its skirt 17, to entrain therewith the outer race 16 about the roller bearing and to cause the jack screw 22 to rise and press the head H upward against the timber. The lifting thrust is adequately transmitted and borne by the grease packed roller bearing R which transmits the thrust downwardly and radially inward to the standard 10 of steel tubing.

There is no likelihood of rapid wear or of jamming or binding since the transmission case fully encloses and mechanically protects the movable parts and is adequately packed with grease at all times and no dust, dirt or grit enters the case. The parts move freely and with little friction on the roller bearing. Moreover the bearing of the jack screw in the nut 19 is inherently lubricated by grease entrained from the case in the upward movement. Therefore, the jack, though of relatively light weight, will give years of adequate service for withstanding relatively tremendous loads and with the need for no attention other than occasionally to replenish the grease through the nipple 27.

The device can be readily released from set position by reversing the direction of rotation of handles 20.

In the alternative embodiment of Fig. 4, the nut is provided with an offset handle comprising an elongated bar 29 headed at 30, passing through an aperture 31 in a rectangular lug 32 unitary with and protruding laterally from the nut 19'. The handle may be slid from one extreme to the other so as to afford greater leverage where necessary or desirable.

As many changes could be made in the above construction, and many apparently widely different embodiments of this invention could be made without departing from the scope of the claims, it is intended that all matter contained in the above description or shown in the accompanying drawings shall be interpreted as illustrative and not in a limiting sense.

Having thus described my invention, what I claim as new and desire to secure by Letters Patent of the United States is:

1. A jack, comprising a tubular standard, a roller bearing structure having an inner race of bore substantially that of said standard and rigidly affixed to the upper part of said standard, a roller cage encompassing said inner race, said inner race having a flange supporting the lower edgs of the rollers of said cage and having an outer race overhanging said standard, a case coaxial with said standard, encompassing said roller bearing structure and defining a grease receptacle thereabout, said case comprising a nut having a cylindrical skirt rigid therewith with an inner shoulder resting upon said outer race and an annulus rigid with the lower end of said skirt, and extending radially thereof nearly to the outer wall of said standard, a baffle plate rigid with said standard between said roller bearing and said annulus, the periphery of said baffle plate extending nearly to the inner wall of said skirt, handles on said nut, a jack screw through said nut, encompassed by said roller bearing and extending through said annulus into said tubular standard, and a grease nipple in said skirt above said baffle plate.

2. A jack, comprising a tubular standard, a jack screw therethrough, a bearing having an inner race mounted on the upper part of said standard, a bearing cage thereabout, an outer race about said cage, a case coaxial with the standard resting upon said outer race encompassing said bearing and defining a grease receptacle thereabout, means to prevent leakage of grease from said case and a nut threaded on said jack screw at the upper part of said case, and having opposed operating handle bars.

3. A jack, comprising a tubular standard, a bearing structure supported at its inner race upon the upper end thereof, a case defining a grease receptacle about said bearing structure and presenting a shoulder carried upon the outer race of said bearing structure, a baffle plate in said case rigid with said standard and below said bearing structure, and a jack screw through said case extending at its lower end into said tubular standard.

EDWARD S. FIELDS.

REFERENCES CITED

The following references are of record in the file of this patent:

UNITED STATES PATENTS

| Number | Name | Date |
|---|---|---|
| 840,770 | Ives | Jan. 8, 1907 |
| 877,386 | Topping et al. | Jan. 21, 1908 |
| 1,450,709 | Bayles | Apr. 3, 1923 |
| 1,574,331 | Wilder | Feb. 23, 1926 |
| 1,914,286 | Pice | June 13, 1933 |
| 2,352,117 | Pasternack | June 20, 1944 |